April 13, 1954 L. FREDERICK 2,675,260
SAFETY LOCK FOR AUTOMOBILE DOORS
Filed Jan. 12, 1952
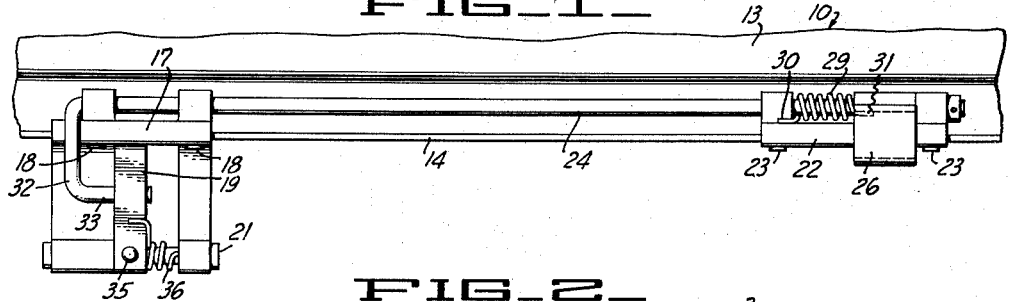
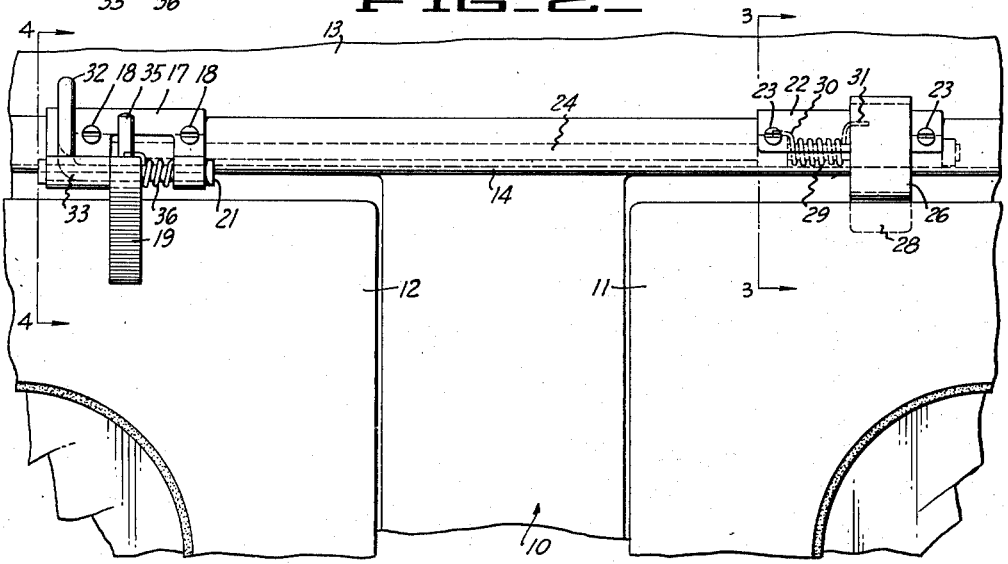
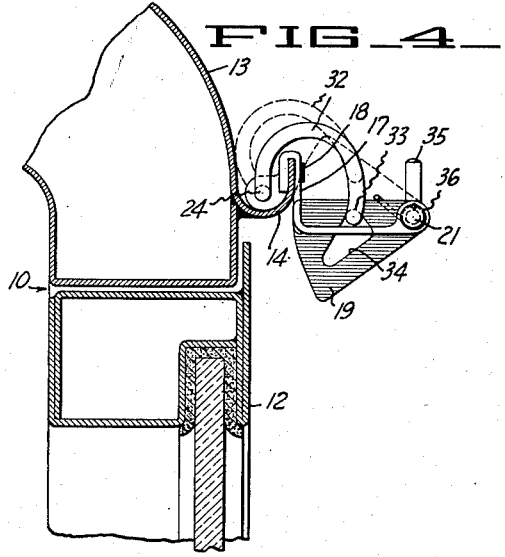
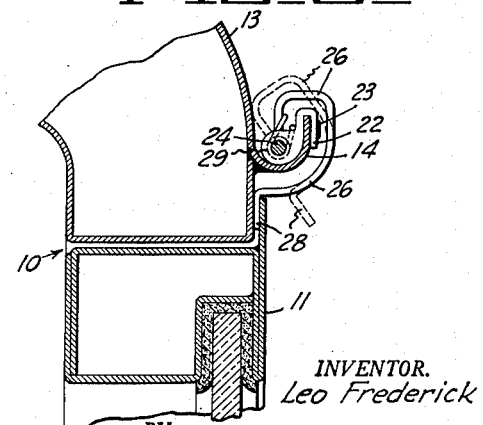
INVENTOR.
Leo Frederick
BY
ATTORNEYS Patented Apr. 13, 1954

2,675,260

UNITED STATES PATENT OFFICE 2,675,260

SAFETY LOCK FOR AUTOMOBILE DOORS

Leo Frederick, Burlingame, Calif.

Application January 12, 1952, Serial No. 266,131

2 Claims. (Cl. 292—195)

This invention relates generally to safety door locking mechanisms for use on automobiles or like automotive vehicles.

In the past various safety locking mechanisms have been installed on automobiles for the purpose of preventing opening of a rear door while the corresponding front door is closed. The mechanisms which have been used for this purpose have been relatively expensive, due both to mechanical design and cost of installation. The mechanical operations required for installation have been generally beyond the skill of a layman, thus necessitating the services of a professional mechanic.

It is an object of the present invention to provide a safety lock mechanism of the above character which can be readily installed by a car owner without the services of a skilled mechanic.

Another object of the invention is to provide a safety locking mechanism of the above character which can be readily adapted to a wide variety of body models, and which when installed will not be unsightly.

Additional objects and features of the invention will appear from the following description in which the preferred embodiment has been set forth in detail in conjunction with the accompanying drawing.

Referring to the drawing:

Figure 1 is a plan view showing a safety lock mechanism in accordance with the present invention, and installed on an automobile.

Figure 2 is a side elevational view of the mechanism shown in Figure 1.

Figure 3 is a cross-sectional detail taken along the line 3—3 of Figure 2.

Figure 4 is a cross-sectional detail taken along the line 4—4 of Figure 2.

At the present time it is conventional practice to equip steel automobile bodies of the four-door sedan type with a metal drain trough which extends horizontally above the upper edges of the doors. This drain trough has considerable inherent strength and is suitable for mounting various devices, including the parts of my locking mechanism, as will be presently explained.

In the drawing I have shown a conventional four-door sedan body 10 including the front and rear doors 11 and 12, the metal car top 13, and the metal drain trough 14 which extends horizontally above the upper edges of the doors.

My safety lock mechanism includes a mounting bracket 17 which is carried by the vehicle body and secured to the drain trough 14 in a position above the door 12. The bracket 17 can vary in design but it is provided with suitable means, such as the clamping screws 18, for securing it firmly to the drain trough. A door engaging latch 19 has a pivotal connection 21 to the bracket 17, and is movable between the lower and raised positions illustrated in solid and dotted lines in Figure 4. When in its lower position the latch is in front of the door 12 and therefore interferes with normal opening of the door. When raised the latch permits normal use of the door.

A second mounting bracket 22 is carried by the vehicle body and shown mounted upon the drain trough above the door 11. This bracket is likewise provided with suitable clamping means such as the screws 23.

An operating rod 24 extends horizontally within the trough 14. Its rear and forward portions are journaled within the brackets 17 and 22. An actuating member 26 is secured to the forward end of the rod 24, and is bent to generally surround the drain trough, and to provide the door engaging tab 28. This actuating member 26 is movable between the positions illustrated in dotted and solid lines in Figure 3. It is spring urged to the position illustrated in dotted lines by suitable means such as the coil spring 29. The ends 30 and 31 of this spring engage respectively the bracket 22 and the member 26. When the door 11 is closed its upper margin engages the tab 28, thus moving the member 26 to the position illustrated in solid lines, and such movement turns the rod 24.

An arm 32 is attached to the rear end of the rod 24, and is bent to generally embrace the drain trough. Its extremity is provided with a finger 33, which extends loosely through an opening 34 in the latch 19. Turning of the rod 24 responsive to movements of the actuating member 26 causes movements of the arm 32 between the positions illustrated in solid and dotted lines in Figure 4. When arm 32 is in its dotted line position, finger 33 lifts the latch 19 to out-of-the-way position of the latter.

It is desirable to provide spring means for urging the latch into its lowermost or door engaging position. For this purpose I have shown a coil spring 36, having its one end acting upon the latch, and its other end engaging the bracket.

The latch can be provided with a projecting lug 35 which can be engaged manually for lifting the latch.

Operation of the mechanism described above is as follows: Assuming installation as illustrated in the drawing, when both doors are closed the actuating member 26 is in the position illustrated in solid lines in Figure 3, and latch 19 and arm 32 are in the position shown in solid lines in Figure 4. The latch 19 therefore prevents accidental opening of the rear door 12. When the front door is opened the actuating member 26 turns under the urge of spring 29 to the position illustrated in dotted lines in Figure 3, and corresponding turning movement of the rod 24 and arm 32, raises the latch 19 against the urge of spring 36 to the out-of-the-way position shown in dotted lines in Figure 4. Therefore the rear door is now free for opening. It will be evident that for this operation the spring 29 is of sufficient strength to overcome the spring 36. If after opening both front and rear doors, the front door is closed first, the rear door can be subsequently closed. This is because the latch 19 is free to move to pass the upper edge of the door 12, because of the size of the opening 34, which provides for lost motion between the latch and the finger 33. Also one may manually lift the latch from the exterior of the car to permit the rear door to open.

It will be evident that my mechanism can be readily installed on any standard automobile body, without the use of a skilled mechanic, and without making any material alterations. When installed the mechanism is relatively neat in appearance, and the operative rod 24 is completely hidden within the trough.

I claim:

1. A safety door locking mechanism for use on automotive vehicles of the type having two adjacent side doors and a metal drain trough carried by the vehicle body and extending horizontally above the upper edges of the doors, said mechanism comprising a latch, means for mounting the latch on said trough in a position adjacent the upper edge of one door, the latch having engaged and disengaged operating positions and when in said engaged position serving to interfere with opening of the associated door, means including a spring and a movable member actuated by the other door against the urge of said spring for moving said latch from engaged to disengaged position of the same, said last means including a motion transmitting rod extending horizontally within said trough between said latch and said member which is engaged by the other door, and means for mounting said movable member upon the vehicle body.

2. A safety door locking mechanism for use on automotive vehicles of the type having two adjacent side doors and a metal drain trough carried by the vehicle body and extending horizontally above the upper edges of the doors, said mechanism comprising a mounting means carried by the vehicle body above the upper edge of one door, a door engaging latch pivotally carried by said mounting means and having a lower door engaging position and an upper out-of-the-way position, a rod extending horizontally within the drain trough, one end portion of the rod being journaled to said mounting means and having an operative connection with said latch whereby upon turning the rod in one direction said latch is lifted from engaged to disengaged position, additional mounting means carried by the body above the upper edge of the other door, said last named mounting means serving to journal the other end portion of said rod, an operating member secured to the other end portion of said rod and extending in a position to engage the upper edge of the corresponding door, and spring means acting upon the rod to turn the same in a direction to lift said latch to its disengaged position, engagement of said operating member by its associated door upon closing the latter serving to turn said rod against the urge of said spring to cause said latch to move to its door engaging position.

References Cited in the file of this patent

UNITED STATES PATENTS

| Number | Name | Date |
| --- | --- | --- |
| 2,137,733 | Tibbetts | Nov. 22, 1938 |
| 2,311,132 | Schnell | Feb. 16, 1943 |
| 2,323,358 | Shannon | July 6, 1943 |
| 2,564,600 | Hummer | Aug. 14, 1951 |